3,141,392
PORTABLE SECTIONAL FLOORING
Irene H. Schneider and Albert W. Schneider, both of 724 N. 59th St., East St. Louis, Ill.
Filed Feb. 16, 1962, Ser. No. 173,630
5 Claims. (Cl. 94—13)

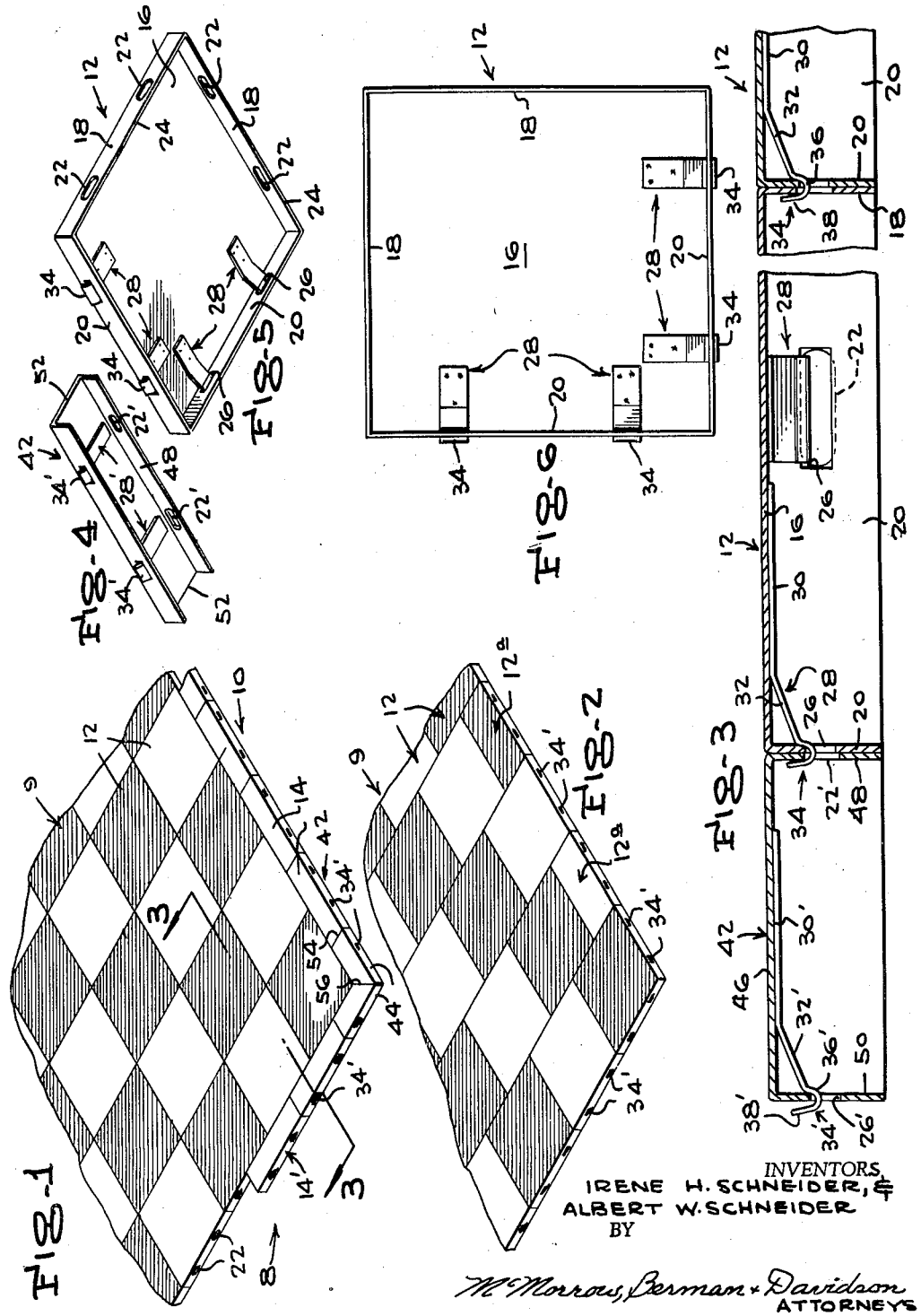

This invention relates to improvements in portable sectional flooring, and more particularly to a novel and improved portable patio.

The primary object of the invention is the provision of generally superior and more practical floor structure of the kind indicated, involving polygonal main sections and polygonal border sections of inverted pan-shaped form, adapted to be decorated in matched or contrasting colors, or with any other desired surface texture or textures, and releasable means for connecting sections together, in abutting relationship, in varieties of relative arrangements of the sections.

Another object of the invention is the provision of floor structure of the character indicated above, wherein opposed side walls of the main and border sections are formed with longitudinal slots and spring clips.

A further object of the invention is the provision, in floor structure of the character indicated above, of spring clips which are attached to the undersides of the top walls of the sections and has upwardly opening hooks, reaching beyond side walls of the sections, the hooks being adapted to embrace and hold together abutted side walls of adjacent sections.

Other important objects and advantageous features of the invention will be apparent from the following description and the accompanying drawings, wherein, for purposes of illustration only, a specific form of the invention is set forth in detail.

In the drawings:

FIGURE 1 is a fragmentary top perspective view of a portable patio in accordance with the present invention, showing the same laid upon a surface, such as sand, dirt, or sod;

FIGURE 2 is a view like FIGURE 1, showing an assembly of main sections in a different arrangement, and before application of border sections thereto;

FIGURE 3 is an enlarged and contracted vertical section taken on the line 3—3 of FIGURE 1;

FIGURE 4 is an enlarged bottom perspective view of a border section;

FIGURE 5 is an enlarged bottom perspective view of a main section;

FIGURE 6 is a further enlarged bottom plan view of a main section.

Referring in detail to the drawings, wherein like numerals designate like parts throughout the several views, portable sectional flooring, in accordance with the present invention, is exemplified by a rectangular portable patio 8, comprising a rectangular main portion 9 and a border 10, composed of main sections 12 and border sections 14. It will be understood that the invention can be embodied in other floor structures of polygonal shape and that the main sections and border sections thereof can be other polygonal shapes. The sections 12 and 14 can be made of any suitable rigid material, such as metal, plastic, or wood, and have various surface treatments.

The main sections 12 are of flat, rectangular pan-shape, herein shown as square, and comprise top walls 16, and pairs of opposed side walls 18 and 20, which extend downwardly from related edges of the top walls 16. The walls 18 are formed with longitudinally elongated and longitudinally spaced rectangular slots 22, spaced midway between the top walls 16 and the lower edges 24 of the side walls 18.

The other side walls 20 are formed with longitudinally elongated oval slots 26, which are slightly shorter than and narrower than the slots 22, as shown in FIGURE 3, which are located to register with slots 26 of an adjacent main or border section. Flat spring clips 28 comprise, as shown in FIGURE 3, elongated shank portions 30, suitably fixed to and extending transversely across the under surfaces of the top walls 16 of the main sections 12, the portions 30 merging, at their outer ends, into downwardly and outwardly angled portions 32, spaced from and at all times out of contact with the top walls 16. The angled portions 32 merge into upwardly opening hooks 34, which comprise arcuate bight portions 36, which reach below the portions 32, and vertically elongated, upwardly extending terminals 38. The terminals 38 of the hooks 34 normally extend through the slots 26, at upward and outward angles relative to the outer sides of the side walls 20, with their bight portions 36 engaged with the upper edges 40 of the slots 26.

As shown in FIGURES 1 and 4, the border sections 14 are longitudinally elongated inverted intermediate and corner channels 42 and 44, respectively, having flat top walls 46, from whose longitudinal edges opposed side walls 48 and 50 depend. The intermediate channels 42 are squared at both ends, as indicated at 52, and the corner channels 44 have one squared end 54 and one angled end 56. The corner channels 44, are as shown in FIGURE 1, shorter than the main sections 12. The intermediate border channels 44 are longer than the corner channels 42, and can be of the same length as the main sections 12. When the border channels 42 and 44 are placed end to end, the intermediate channels 44 bridge adjacent main sections 12, and cover the separations of adjacent main sections, as shown in FIGURE 1.

The side walls 48 of the corner and intermediate border sections are formed with longitudinally elongated, longitudinally spaced slots 22', corresponding in size and placement of the slots 22 of the main sections 12, and the walls 50 are formed with oval slots 26', corresponding in size and placement with the slots 26 of the main sections.

Connecting clips 28', similar to and arranged like the clips 28 of the main sections 12, have hooks 34' extending through the slots 26'.

The patio 10 is assembled by first assembling the main sections 12, and then assembling and applying the border channels 42 and 44 thereto. As shown in FIGURE 2, the main sections 12 can be supplemented by supplementary main sections 12ª, preferably about half the width of the main sections 12, so as to provide for a staggered, rather than an aligned arrangement of the main sections.

Assembly of the main sections 12 is preferably performed by connecting the same together in aligned rows. This is done by laying a first main section upon the supporting surface for the patio, and then locking the hooks 34 of the next section through the slots 22 of the first section, with the next section held at an upward angle relative to the first section for entering the terminals 38 of the hooks into the slots 22, and then swinging the next section downwardly to the supporting surface, so that side walls of the two sections abut, as shown in FIGURE 3. The apertures of the hooks 34 are somewhat smaller than the combined thicknesses of the abutted side walls, so that these walls are gripped with the hooks under tension, so that the outer surfaces of these walls are forcibly held together in abutting relationship, and any tendency of the main sections to rock or shift relative to each other is eliminated, where the supporting surface for the sections is reasonably even. Additional sections are successively connected together to form a row of sections of the required length. When the desired number of rows of main sections have been formed, as outlined above, they are connected together, in coextensive, side-by-side relationship, by passing the hooks 34 through slots 22, in the manner described above.

The main sections 12 and any supplementary main sections 12ᵃ having been assembled, the border sections, including the corner channels 44 and the intermediate channels 42 are connected to the exposed outer edges of the main sections, by inserting the hooks 34′ into the slots 22 of the main sections, in the manner described hereinabove, with the squared ends 52 of the intermediate channels abutted, and with the angled ends 56 of the corner channels abutted.

The various sections are adapted to be disconnected and separated, simply by angling sections upwardly relative to other sections, so that the terminals 38 and 38′ of the hooks 34 and 34′ are disengaged from the slots 22 of the main sections.

Although there have been shown and described preferred forms of the invention, it is to be understood that the invention is not necessarily confined thereto, and that any change or changes in the structure of an in the relative arrangements of components thereof are contemplated as being within the scope of the invention as defined by the claims appended hereto.

What is claimed is:

1. In a structure of the character described, a main rectangular portion comprising a plurality of rectangular pan-shaped main sections, each section comprising a flat top wall and pairs of opposed depending side walls, one wall of each pair being formed with longitudinally spaced slots, the other wall thereof being formed with longitudinally spaced slots adapted to register with the slots of the one wall of the adjacent section, spring clips having shanks secured to the under surfaces of the top walls of each section, declining portions on the outer ends of the shanks aligned with the other wall slots, said declining portions terminating in vertically opening hooks having arcuate bight portions extending through the other wall slots, said bight portions terminating in vertical terminals spaced from the outer surfaces of said other walls, said one wall and said other walls of the sections being in abutting relationship with the hook terminals engaged through slots of the one wall and with the bight portions of the hooks spread under tension and clamping abutted one and other walls together.

2. In a structure of the character described, a main rectangular portion comprising a plurality of rectangular pan-shaped main sections, each section comprising a flat top wall and pairs of opposed depending side walls, one wall of each pair being formed with longitudinally spaced slots, the other wall thereof being formed with longitudinally spaced slots adapted to register with the slots of the one wall of the adjacent section, spring clips having shanks secured to the under surfaces of the top walls of each section, declining portions on the outer ends of the shanks aligned with the other wall slots, said declining portions terminating in vertically opening hooks having arcuate bight portions extending through the other wall slots, said bight portions terminating in vertical terminals spaced from the outer surfaces of said other walls, said one wall and said other walls of the sections being in abutting relationship with the hook terminals engaged through slots of the one wall and with the bight portions of the hooks spread under tension and clamping abutted one and other walls together, said main sections comprising full width sections and half-width sections, with the full width sections staggered relative to other full width sections, the half-width sections being fitted to complete the over-all rectangular structure when the main sections are staggered.

3. In a structure of the character described, a main rectangular portion comprising a plurality of rectangular pan-shaped main sections, each section comprising a flat top wall and pairs of opposed depending side walls, one wall of each pair being formed with longitudinally spaced slots, the other wall thereof being formed with longitudinally spaced slots to register with the slots of the one wall of the adjacent section, spring clips having shanks secured to the under surfaces of the top walls of each section, declining portions on the outer ends of the shanks aligned with the other wall slots, said declining portions terminating in vertically opening hooks having arcuate bight portions extending through the other wall slots, said bight portions terminating in vertical terminals spaced from the outer surfaces of said other walls, said one wall and said other walls of the sections being in abutting relationship with the hook terminals engaged through slots of the one wall and with the bight portions of the hooks spread under tension and clamping abutted one and other walls together, and a border surrounding said main portion, comprising a plurality of intermediate inverted channels having squared ends, and inverted corner channels having squared ends abutting squared ends of intermediate channels and angled ends abutting angled ends of corner channels, said channels having top walls and inner side walls and outer side walls depending from the top walls, the inner side walls having longitudinally spaced slots through which terminals and bight portions of hooks on main sections extend, with the bight portions spread under tension and clamping together in abutting relationship inner side walls of the channels and other walls of main sections.

4. In a structure of the character described, a main rectangular portion comprising a plurality of rectangular pan-shaped main sections, each section comprising a flat top wall and pairs of opposed depending side walls, one wall of each pair being formed with longitudinally spaced slots, the other wall thereof being formed with longitudinally spaced slots adapted to register with the slots of the one wall of the adjacent section, spring clips having shanks secured to the under surfaces of the top walls of each section, declining portions on the outer ends of the shanks aligned with the other wall slots, said declining portions terminating in vertically opening hooks having arcuate bight portions extending through the other wall slots, said bight portions terminating in vertical terminals spaced from the outer surfaces of said other walls, said one wall and said other walls of the sections being in abutting relationship with the hook terminals engaged through slots of the one wall and with the bight portions of the hooks spread under tension and clamping abutted one and other walls together, and a border surrounding said main portion, comprising a plurality of intermediate inverted channels having squared ends, and inverted corner channels having squared ends abutting squared ends of intermediate channels and angled ends abutting angled ends of corner channels, said channels having top walls and inner side walls and outer side walls depending from the top walls, the inner side walls having longitudinally spaced slots through which terminals and bight portions of hooks on main sections extend, with the bight portions spread under tension and clamping together in abutting relationship inner side walls of the channels and other walls of main sections, the corner channels being shorter than the intermediate channels, the main sections being arranged in aligned rows, with the intermediate channels bridging the separations between adjacent rows of main sections.

5. In a structure of the character described, a main portion comprising a plurality of abutting rectangular inverted pan-shaped sections, said sections comprising top walls and pendant side and end walls on the edges of the top wall, said walls being formed with spaced horizontal slots, the slots of the two side walls being aligned and the slots of the two end walls being aligned, spring clips having shanks fixed and angled downwardly from the top wall and extending to an adjacent side wall and end wall in line with their slots, said shanks terminating in upwardly opening hooks, said hooks having upstanding terminals spaced from the outer sides of the adjacent walls, said hooks embracing the upper edges of the slots of said adjacent walls and embracing the upper edges of the slots of related walls of other sections abutted with said adjacent walls, a border for said main portion comprising elongated inverted rectangular pan-shaped sections open at their ends, said border sections having top walls and opposed inner and outer side walls, said side walls being formed with aligned and spaced horizontal slots, the inner side walls of the border sections being abutted with one of the adjacent walls of adjacent main portion sections and bridging the gaps between adjacent main form sections, clip hooks of main portion sections being engaged through slots of the inner side walls of the border sections in embracing relation to their upper edges.

References Cited in the file of this patent

UNITED STATES PATENTS

| | | |
|---|---|---|
| 1,693,438 | Goodell | Nov. 27, 1928 |
| 1,841,819 | Kellett | Jan. 19, 1932 |
| 1,980,906 | Bretland | Nov. 13, 1934 |
| 2,005,380 | Marsh et al. | June 18, 1935 |
| 2,173,020 | Kubach | Sept. 12, 1939 |
| 2,377,211 | Cocken | May 29, 1945 |
| 2,836,108 | Monick | May 27, 1958 |

FOREIGN PATENTS

| | | |
|---|---|---|
| 821,549 | Great Britain | Oct. 7, 1959 |